United States Patent
Birch (10) Patent No.: US 8,897,479 B2
(45) Date of Patent: Nov. 25, 2014

(54) HEADSET WITH ROTATABLE EARPHONE HOUSING

(75) Inventor: Ole Birch, Naerum (DK)

(73) Assignee: GN Netcom A/S (DK)

(*) Notice: Subject to any disclaimer, the term of this patent is extended or adjusted under 35 U.S.C. 154(b) by 315 days.

(21) Appl. No.: 13/338,508

(22) Filed: Dec. 28, 2011

(65) Prior Publication Data

US 2012/0163616 A1    Jun. 28, 2012

(30) Foreign Application Priority Data

Dec. 28, 2010   (EP) .................................... 10197145

(51) Int. Cl.
| | |
|---|---|
| H04R 25/00 | (2006.01) |
| H04R 1/10 | (2006.01) |
| H04R 1/08 | (2006.01) |
| H04M 1/60 | (2006.01) |

(52) U.S. Cl.
CPC ............. *H04R 1/083* (2013.01); *H04M 1/6058* (2013.01); *H04R 1/1066* (2013.01); *H04R 2201/107* (2013.01); *H04R 2201/109* (2013.01); *H04R 2420/07* (2013.01)
USPC ............. 381/375; 381/74; 381/367; 381/371; 381/379; 381/384

(58) Field of Classification Search
CPC ........ H04R 5/033; H04R 1/083; H04R 1/105; H04R 1/1066
USPC .................... 381/74, 367, 371, 375, 384, 379
See application file for complete search history.

(56) References Cited

U.S. PATENT DOCUMENTS 4,875,233 A    10/1989   Derhaag et al.

FOREIGN PATENT DOCUMENTS

| CN | 1241105 | 1/2000 |
|---|---|---|
| CN | 1625297 | 6/2005 |
| CN | 101395959 | 3/2009 |
| EP | 2178275 | 4/2010 |
| EP | 2178275 A1 | 4/2010 |

OTHER PUBLICATIONS

English translation of Chinese Office Action from the corresponding Chinese patent application 201110448744.6 dated Nov. 27, 2013.
Office Action dated Aug. 13, 2014 for Chinese Application No. 2011104487446 with an English translation.

*Primary Examiner* — Paul S Kim
*Assistant Examiner* — Douglas Suthers
(74) *Attorney, Agent, or Firm* — Altera Law Group, LLC (57) ABSTRACT

A headset for voice communication is provided, the headset has a first earphone housing being rotatable about a first rotational axis, and a pickup unit comprising at least one microphone arranged on the earphone housing. The earphone housing comprises an earphone housing circuit, a first speaker for receiving a speaker signal from the earphone housing circuit, and at least a first ring of electrically conductive material formed annularly about the first rotational axis and mounted in electrical contact with the earphone housing circuit. An earphone housing connector part comprises at least a first set of contact members mounted in the earphone housing connector part so as to provide electrical connection between the at least first set of contact members and the at least first ring, to thereby connect the at least first set of contact members to a second speaker and/or an electronic circuit for processing signals.

18 Claims, 5 Drawing Sheets

HEADSET WITH ROTATABLE EARPHONE HOUSING

FIELD OF INVENTION

The present invention relates to headsets for audio transmission, such as for voice communication, and in particular to headsets having a rotatable earphone housing.

BACKGROUND OF THE INVENTION

It is well known to provide headsets for audio communication, the headsets typically having one or two earphones and a microphone, such as a microphone mounted on a boom or a mouthpiece. For headsets having two earphones, the earphones are typically connected via headbands, neckbands or other suitable means. To provide audio from one earphone housing to the other, an electrical connection connects the two earphones. The headsets may furthermore be wired or wireless, where the wireless headsets include a wireless communication hub, whereas the wired headsets connect signals from the headset to a telephone system and vice verse by wire. Typically, the wired connection is provided via a joint.

In order to protect the wires passing through the joint from damage due to twisting, arising from rotation to the joints, typically these joints are fixed joint, i.e. non-rotatable joints, making it cumbersome for a user to adjust the headset to a most favourable position, for example when switching from one ear to another. Furthermore, when putting the headset down and picking it up numerous times a day, the wires may get tangled. Alternatively, the joints may include a mechanical stop to restrict rotation. Such a mechanical stop then acts to limit the travel of the joint to less than a full revolution or to less than 360 degrees. However, failure of the mechanical stop is a common cause for malfunction of the headsets as such stops may simply break off. Furthermore, a joint having a mechanical stop makes it more cumbersome for a headset user to adjust the headset.

It is known in the art to provide a rotatable microphone boom, such as to allow a user to e.g. switch from one ear to another and move the microphone boom to the desired position. Such headsets may have a microphone boom with a mechanical stop to restrict the movement of the microphone boom, however also microphone booms without a mechanical stop, such as disclosed in EP 2 178 275, where the microphone boom is fully rotatable are known in the art.

However, using a rotatable microphone boom is not always advantageously. Typically, the boom is delicate and the rotatable connection can be complex, thereby adding to the costs of the products. Thus, for cost sensitive consumer headsets other ways of optimizing the ergonomics and user friendliness of the headsets must be found. It is therefore an object of the present invention to provide a headset overcoming one or more of the disadvantages of the prior art.

SUMMARY OF THE INVENTION

According to the invention, a headset for voice communication is provided,
the headset having
a first earphone housing being rotatable about a first rotational axis, and having a pickup unit comprising at least one microphone arranged on the earphone housing, wherein the at least one microphone is electrically connected to an earphone housing circuit,
the first earphone housing comprising
the earphone housing circuit,
a first speaker electrically connected to the earphone housing circuit, and
at least a first ring of electrically conductive material formed annularly about the first rotational axis and mounted in electrical contact with the earphone housing circuit, and
an earphone housing connector part comprising
at least a first set of contact members mounted in the earphone housing connector part so as to provide electrical connection between the at least first set of contact members and the at least first ring, for connecting the at least first ring to a second speaker, and/or a hard-wired line entering/exiting the headset. The hard-wired line may connect to an electronic circuit for processing signals from the at least one microphone, a base unit, such as a base unit for a voice communication system, such as a telephone system, an external speaker, an external microphone, a headset amplifier, a USB controller, etc. and/or any combination of these.

The headset may be of a type typically connecting a user to an audio system, such as an audio/speaker system, for example to a telephone system, such as a soft phone system, such as an IP phone system, a wireless phone system, such as a cellular phone system, or a landline based phone system, etc. The headset according to the present invention may connect to the audio system via any base unit, such as a base unit for e.g. a cordless system, a headset amplifier for e.g. a corded headset, a base amplifier, or an amplifier unit, etc., or the headset may connect directly to the audio system.

It is an advantage of the headset according to the invention that the connection to either a hard-wired external device or a second speaker is rotatable around the axis with no restrictions or build-in stops. The earphone housing and the earphone housing connector part are mutually rotatable around a first rotational axis, and by providing a ring of electrically conductive material in the earphone housing and a corresponding set of contact members in the earphone housing connector part for contacting the ring, a sliding contact is realised. Providing a sliding electrical connection between the earphone housing circuit and the second speaker and/or the hard-wired line entering/exiting the headset allows for the elimination of wires through these connections.

It is envisaged that in other embodiments, it may be advantageous to provide the at least first ring of electrically conductive material in the earphone housing connector part, and provide the at least first set of contact elements in the earphone housing.

In one embodiment, the at least first set of contact members extend from a predetermined limited part of the earphone housing connector part, thereby reducing the overall size of the connection. The predetermined limited part may e.g. be within a certain part of a radius of the earphone housing connector part. For a headset, the size of any component matters, and, especially for connections in a direction normal to the first rotational axis of the earphone housing, space is limited.

The at least first set of contact members may be fixedly mounted in the earphone housing connector part. The fixedly mounted set of first contact members is thereby rotatable with the earphone housing connector part, and the number of moving parts is reduced.

The earphone housing connector part may form part of the earphone housing, so that the earphone housing comprises the earphone housing connector part. Thus, for a user of a headset, the earphone housing connector part will not be immediate recognizable as a connector part.

The electronic circuit for processing signals from the at least one microphone may be positioned in the earphone housing and the microphone may connect to the electronic circuit in any known way. However, in some headsets it is advantageously to provide the electronic circuit outside of the earphone housing. Thus, in some embodiments, the base unit comprises the electronic circuit for processing signals from the at least one microphone. The advantage of providing the electronic circuit for processing signals from the at least one microphone in the base unit is that only a simple earphone housing circuit needs to be arranged within the earphone housing, thereby reducing the overall weight of the headset.

The earphone housing circuit may, thus, be a passive electrical circuit, directing signals from one part of the earphone housing to another, or the earphone housing circuit may include one or more functionalities. The earphone housing circuit may furthermore include passive and active components, and still further, the earphone housing circuit may comprise the electronic circuit for processing signals from the at least one microphone. Furthermore, the earphone housing circuit may comprise electronics for establishing wireless or cordless communication with the voice communication system, via any known standard such as via DECT, Bluetooth, etc.

The at least first ring of electrically conductive material formed annularly about the first rotational axis may form part of the earphone housing circuit or the at least first ring of electrically conductive material may be formed separately from the earphone housing circuit and connected to the circuit by any known means. In a preferred embodiment, the earphone housing circuit is provided on one side of a printed circuit board, and the at least first ring of electrically conductive material is provided on another side of the printed circuit board, wherein the connections are made e.g. via throughholes in the printed circuit board. It is an advantage of providing the annular rings directly on the printed circuit board that the design may be particular compact. Furthermore, by providing the annular ring(s) directly on the printed circuit board, fewer parts need to be assembled. In one embodiment, the earphone housing circuit include the electronic circuit for signal processing signals from the at least first microphone, and the at least first ring of electrically conductive material, whereby the number of parts needed to be assembled during manufacturing is further reduced.

In an embodiment of the invention, the ring of electrically conductive material is provided on a flexible material, such as on a flexible foil, such as on a flexible base material, such as on a Flex Foil, alternatively, the rings may be made entirely in a flexible conductive foil, such as a flexible metallic foil. In one embodiment, at least one annular ring is flexible, and the flexible ring of electrical conductive material is arranged circumferentially on a housing of the first speaker.

The at least first ring of electrically conductive material may be formed in any electrically conductive material and the contact member(s) may also be formed in or at least be coated with any electrically conductive material, such as copper, aluminum, gold, etc. The ring(s) may be formed in a metallic material having a gold plating. However, the ring(s) may also be are made entirely of gold. The at least first ring of electrically conductive material and/or the contact members may comprise gold surfaces, at least in a region wherein the at least first annual ring and the contact member come into contact. It is an advantage of providing at least a gold plating of the ring(s) and/or the contact member(s), that the gold minimizes the changes to the surfaces, as gold surfaces are less prone to changes over time, such as oxidization. Changes such as oxidization in the surface(s) of the ring(s) and/or the contact member(s) may have detrimental effect on the sound quality of the audio signal transmitted over the connection, since such changes may cause variations in the resistance of the connection between the contact member(s) and the ring(s) and thereby cause variations in the signal transferred via the ring(s) and contact member(s).

The at least first contact member may be resiliently biased or spring-loaded towards the at least first ring. Thus, the contact member(s) may yield as the joint is rotated which minimizes wear of the annular ring(s) and the contact member(s). Also, second, third, etc. contact members may be resiliently biased.

Furthermore, a headset may be provided wherein the first earphone housing comprises at least a first and a second ring of electrically conductive material arranged annularly around the first rotational axis and wherein the earphone housing connector part comprises corresponding first and second sets of contact members. It is envisaged that also third, fourth, fifth and sixth rings, etc. of electrically conductive material may be arranged annularly around the first rotational axis, and that the earphone housing connector part comprises corresponding third, fourth, fifth and sixth sets of contact members, etc.

The rings may be arranged coaxially around the first rotational axis, and these further contact members may also be resiliently biased towards the corresponding rings.

In an exemplary embodiment, the second ring of electrically conductive material may connect to a second microphone in the pick-up unit, provide for connections from a second microphone to either a second speaker, and/or a hardwired line entering/exiting the headset, such as a hard-wired line connecting to the electronic circuit for processing signals from the at least one microphone, to a base unit, such as a base unit for a telephone system, to an external speaker, to an external microphone, etc. e.g. as part of a system for providing a directionally sensitive microphone system.

The sets of contact members may be provided substantially perpendicular to the annularly formed first ring. In a preferred embodiment, two or more contact members in any set of contact members may be connected in parallel for providing parallel electrical connection between each ring and the corresponding contact members. Thereby, any disturbances or variations in the signal from one of the two or more contacts may be levelled out using the other of the two or more contacts.

The contact members may be mounted in the earphone housing connector part in proximity to the hard-wired connection exiting/entering the earphone housing. The contact members may furthermore be positioned along a part of the circumference of the earphone housing connector part. Furthermore, in an embodiment, the earphone housing connector part has a circular part arranged to rotate fittedly about the speaker housing and a protruding part extending outwardly from the circular part, in which protruding part the contact members are fixedly mounted.

It is furthermore preferred to have a first and a second contact member in any set of contact members extending from the earphone housing connector part under oblique angles toward the ring, so that under rotation of the earphone housing and/or the earphone housing connector part about the first rotational axis, the first contact member extends in the direction of rotation, and the second contact member extends opposite to the direction of rotation.

By arranging the two contact members to extend in opposite directions around the rotational axis, one contact member is always pulled along the annular ring while another is always pushed, regardless of the direction of rotation. This helps improve the quality of the electrical connection, since a contact member that is pushed along the annular ring may skip, thus breaking the connection, while a contact member which is pulled along is better adapted to maintain connection.

The pickup unit may comprise or consist of a microphone boom.

The invention will now be described in more detail by way of example only, with reference to the accompanying drawing, wherein like reference numerals reference same feature. In the drawing:

Figure 1:
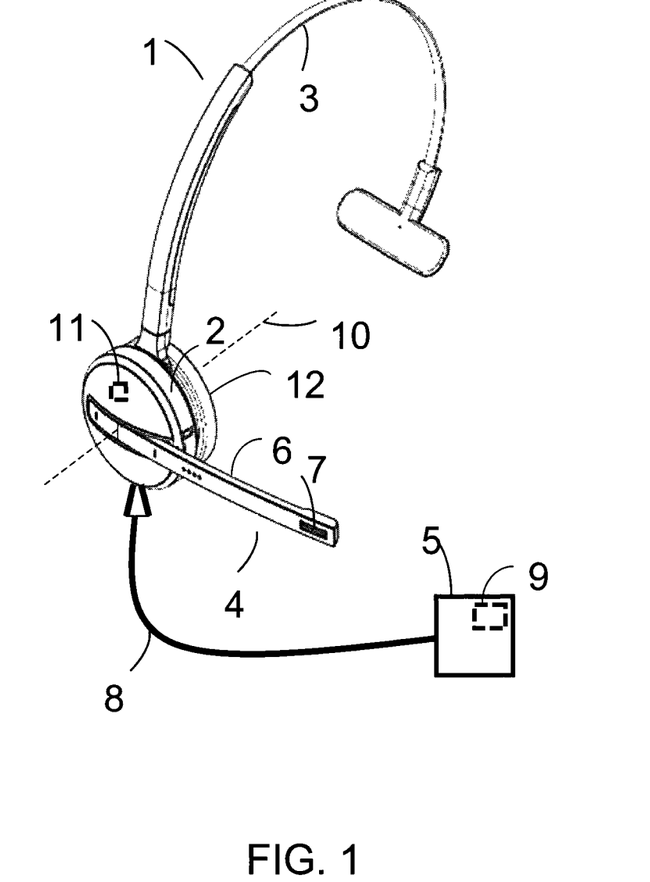
FIG. 1 shows a wired headset with one earphone.

FIG. 1 shows a headset 1 according to the present invention. The headset 1 is a wired headset having one earphone housing 2, a headband 3, and a pickup unit 4 having a microphone boom 6 with a microphone 7 arranged on the earphone housing 2. The headset is of a wired type, and a wired connection 8 connects the headset 1 to an external telephone system, such as a soft phone system via base unit 5. It is envisaged that the base unit 5 may be dispensed with so that the headset 1 connects directly to a voice communication system such as to a computer, a network, or a standard telephone. In FIG. 1, the base unit 5 comprises the electronic circuit for processing signals 9 from the at least one microphone 7 and is connected to the microphone/earphone housing through the wired connection 8. It is envisaged that the present invention also encompasses an embodiment wherein the electronic circuit for processing signals 9 is comprised within the earphone housing 2 so that the wired connection connects the processed microphone signal to a voice communication system.

The earphone housing 2 is rotatable about a first rotational axis 10 indicated by a dashed line in the figure, so that the earphone housing 2 with the pickup unit 4 may be rotated when arranging and adjusting the headset 1 and e.g. move the pickup unit 4 from one side of the head to another. The earphone housing comprises a speaker in a housing (not shown in FIG. 1) and an earphone housing circuit shown schematically as 11. It is an advantage of the present invention that the earphone housing 2 is connected with the external hard-wired connection 8 via earphone housing connector part 12, shown in detail in FIGS. 3 and 4, which is freely rotatable with respect to the earphone housing. In this way, the line 8 is freely rotatable and allows the user to adjust the headset in any way convenient for the user without being restricted by the connection 8 exiting/entering the headset 1.

The earphone housing connector part 12 forms part of the earphone housing 2. The headband 3 has no electrical connections to the earphone housing and may in any conventional way be rotatable with respect to the earphone housing.

Figure 2:
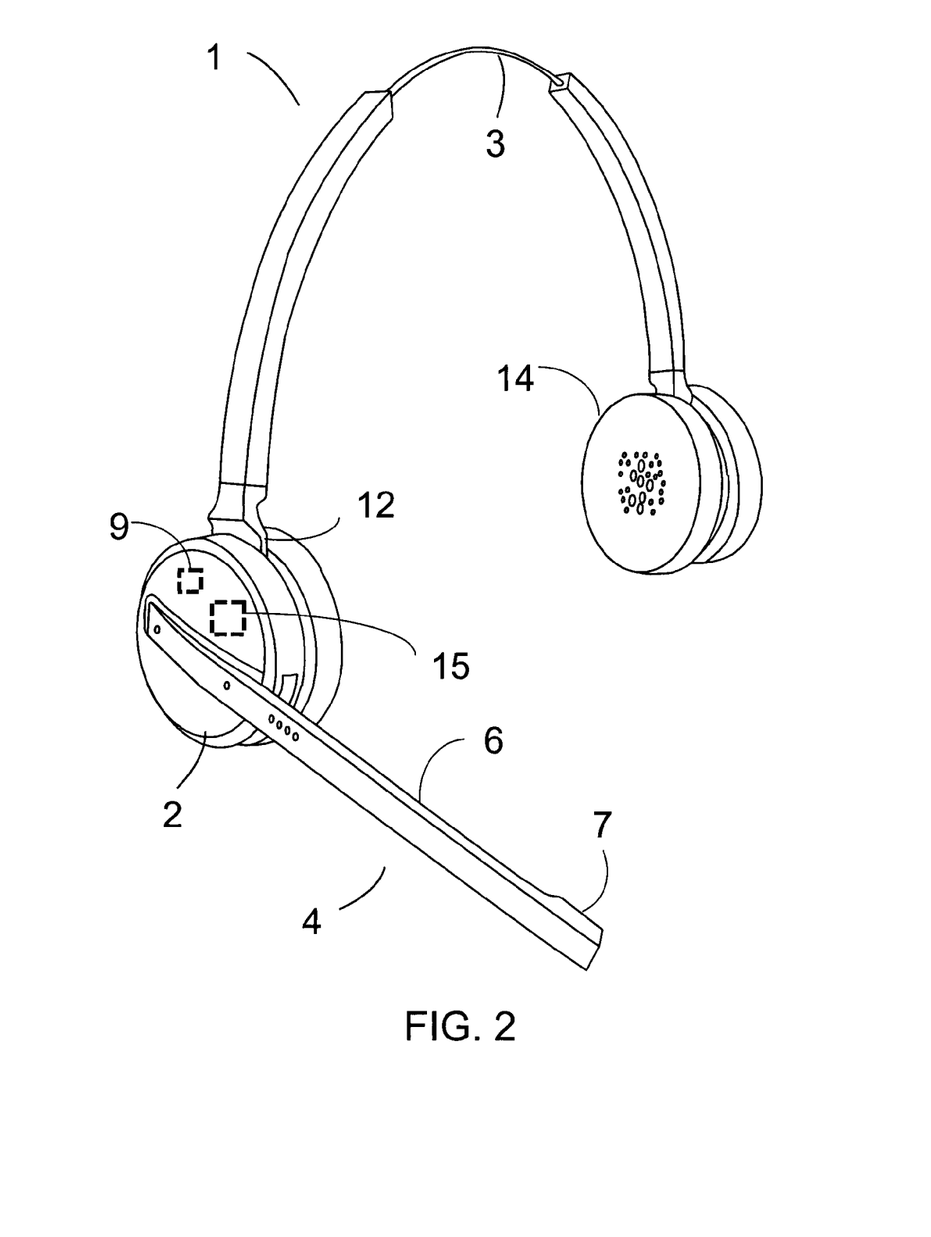
FIG. 2 shows a wireless headset with two earphones.

FIG. 2 shows another embodiment of the present invention. A headset 1 having a first 2 and a second 14 earphone housing is shown. In the embodiment shown, the earphone housing comprises the electronic processing circuit for processing signals from the at least one microphone, shown schematically as 9, and further comprises a wireless or cordless communication device 15, such as a cordless communication device communicating with the external voice communication system via DECT, Bluetooth, etc. A headset having two earphones requires an electrical connection from the first earphone housing 2 to the second earphone housing 14. Typically, this is achieved by pulling a wire from the earphone housing circuit, which in the present embodiment forms part of the electronic processing circuit 9, through a connection to the second earphone housing 14. By using the earphone housing connector part 12, it is achieved that the earphone housing and the headband 3 connecting to the second earphone housing 14 is mutually rotatable to 360 degrees without restrictions. In this way, the pickup unit 4 arranged on the earphone housing 2, is freely rotatable with the earphone housing, thus allowing the user to adjust the headset in any way convenient for the user without being restricted by a wired fixed joint between the earphone housing and the headband.

Figure 3:
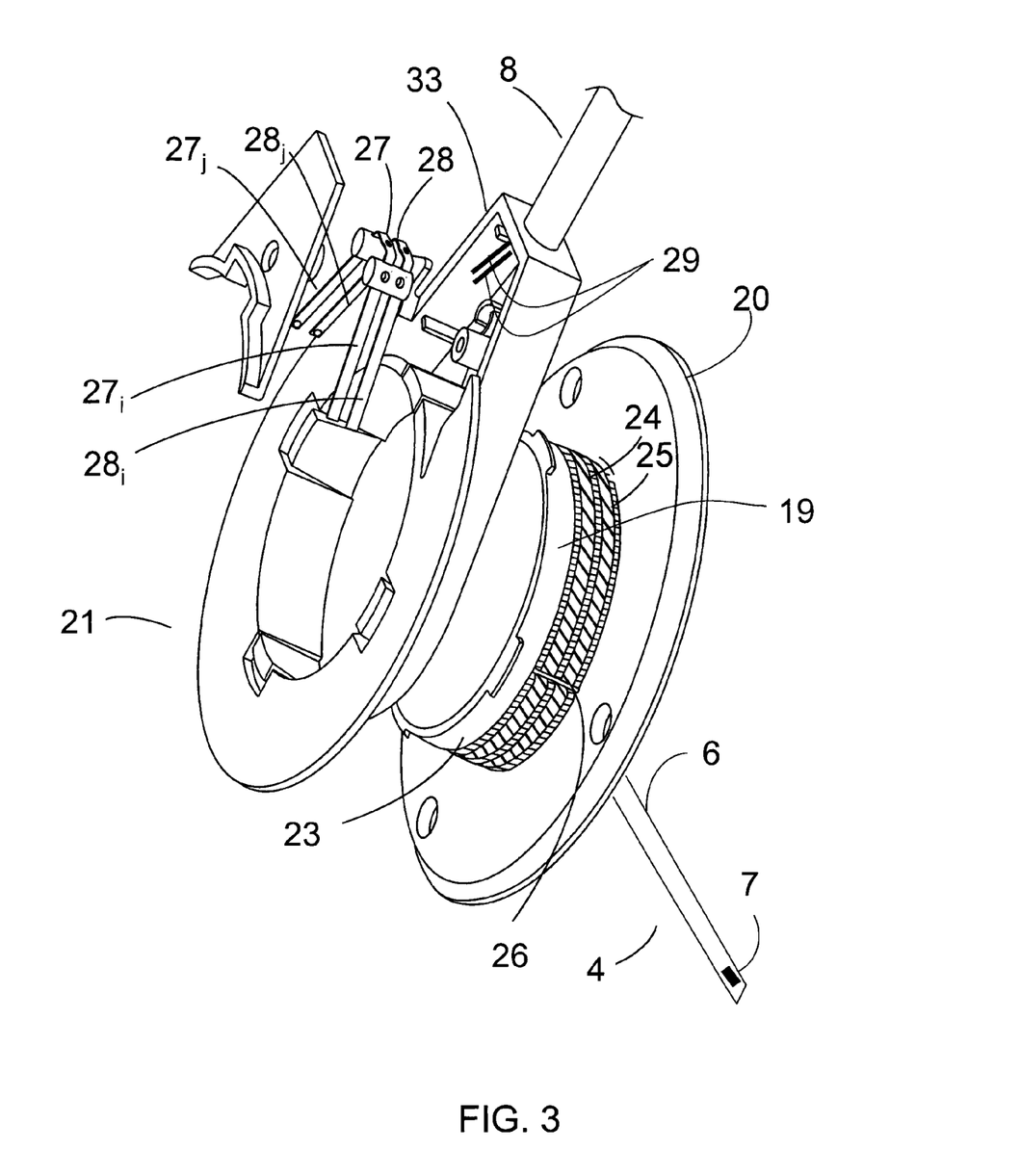
FIG. 3 shows an exploded view of an embodiment of a headset according to the present invention.

FIG. 3 shows an exploded view of the earphone housing 20 and the earphone housing connector part 21. The pickup unit 4 is provided on the earphone housing 20 and has a microphone boom 6 and a microphone 7. The speaker 23 and the microphone 7 are electrically connected to the earphone housing circuit (not shown in FIG. 3), and a first ring 24 and a second ring 25 of electrically conductive material are formed annularly about the first rotational axis and mounted in electrical contact with the earphone housing circuit (not shown) through via holes 26. The rings 24, 25 are formed as gold plated contacts on a flex foil and arranged around the speaker housing 19 to minimize space used by the contacts. The earphone housing circuit is arranged within the earphone housing 19. The earphone housing connector part 21 has a first set of contact members 27 and a second set of contact members 28 mounted in the earphone housing connector part 21, in the protruding part 33 so as to provide electrical connection between the first and second set of contact members 27, 28 and the first 24 and second 25 ring, respectively.

The first set of contact members 27 and the second set of contact members 28 each comprise a number of contact elements. In FIG. 3, each set has first contact elements 27i and 28i and second contact elements 27j and 28j. Wires 29 connect to the contact members 27, 28 via connecting components 30. The wires connect to a second speaker via a circuit (not shown) in the second earphone housing 14

It is envisaged that a multitude of configurations may be provided. For example, a two-microphone headset wherein the processing of the microphone signals is performed outside of the earphone housing would require six electrically conductive rings, and corresponding contact members: two rings for each microphone, and another two rings for the speaker signal. An additional ring may be added for providing a power signal, if no battery is provided within the earphone housing.

Figure 4:
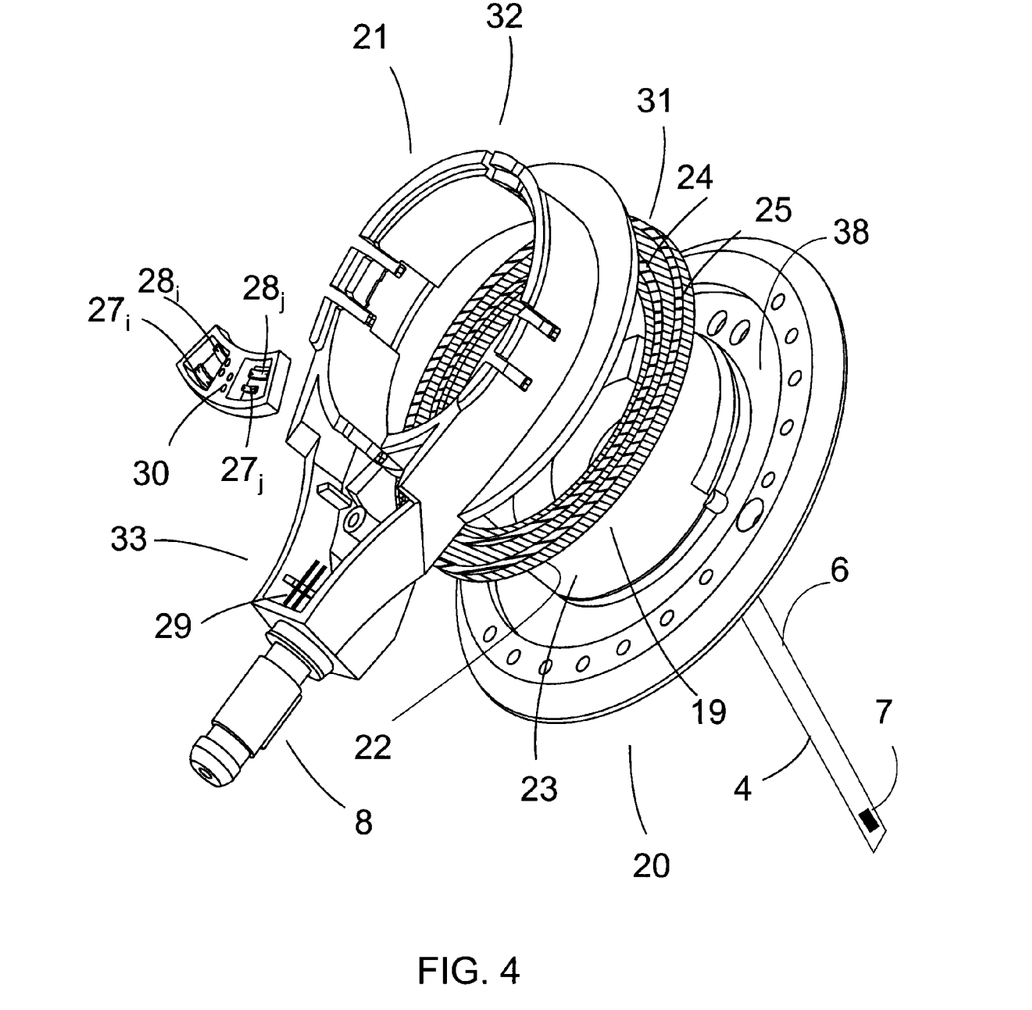
FIG. 4 shows an exploded view of another embodiment of a headset according to the present invention.

FIG. 4 shows another embodiment of the present invention wherein same reference numerals represent same features as in FIG. 3. The first ring 24 and second ring 25 of electrically conductive material are in this embodiment formed concentrically around the rotational axis, and is provided on printed circuit board 31. Each of the two annular rings is connected to the earphone housing circuit 22. In FIG. 4, the earphone housing circuit 22 is provided on the opposite side of the first and second rings on a dual-side printed circuit board 31. The connections between the first and second rings and the earphone housing circuit may be made in any conventional manner, e.g. wired or via through-holes, and these connections are not shown here.

The earphone housing connector part 21 has a first set of contact members 27 and a second set of contact members 28 mounted in the earphone housing connector part 21 so as to provide electrical connection between the first and second sets of contact members 27, 28 and the first 24 and second 25 ring, respectively.

The first set of contact members 27 and the second set of contact members 28 each comprise a number of contact elements. In FIG. 4, each set has first contact elements 27i and 28i and second contact elements 27j and 28j provided in a frame. Wires 29 connect to the contact members 27, 28 via connecting components 30 formed integratedly with the frame. The wires connect to a base unit 5 (not shown), or alternatively or additionally, to a second speaker. It is seen in FIG. 4 that the earphone housing connector part 21 has a circular part 32 and a protruding part 33 in which the contact members 27, 28 are provided.

Figure 5:
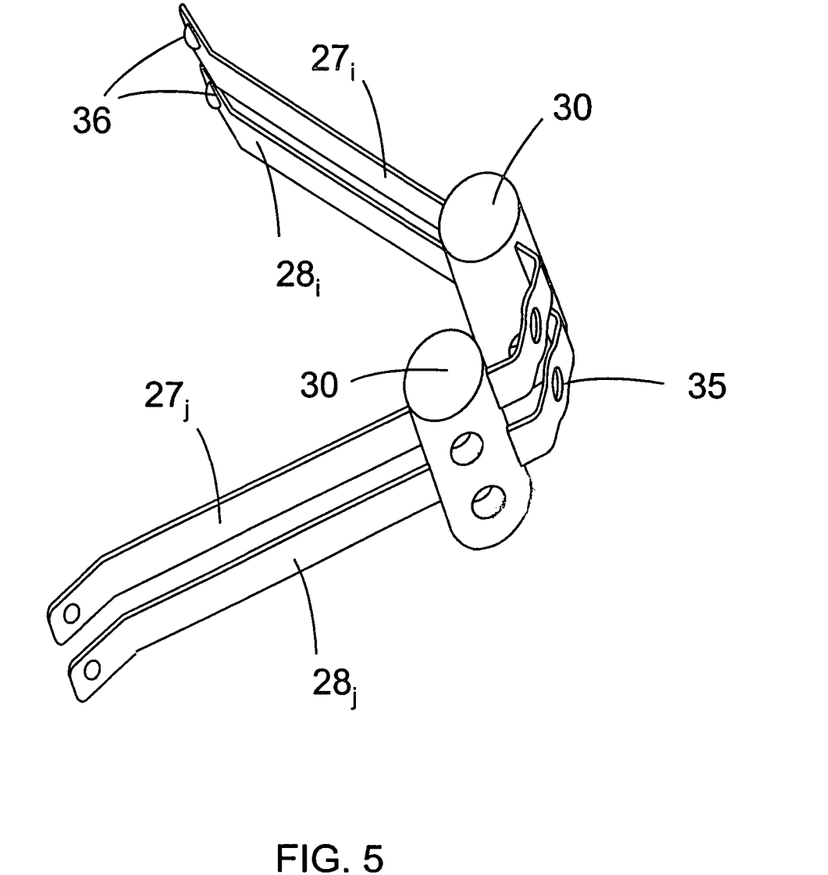
FIG. 5 shows a detailed view of a contact member.

FIG. 5 shows an example of the contact elements 27, 28 in more detail. In FIG. 5, two copper strips with gold plated contact bumps 36 for contacting the electrically conductive rings are provided. Connecting components 30 are provided for securing the wires 29 (not shown in FIG. 5) to the copper strips. The copper strips have through-holes 35 for connecting the contact elements 27, 28 to the earphone housing connector part 21. As is also shown in FIG. 4, the contact elements may have any form and shape, and be provided in a frame which frame is connected to the earphone housing connector part.

The invention claimed is:

1. A headset for voice communication, the headset comprising:
    an earphone circuit;
    a first earphone housing being rotatable about a first rotational axis, said housing including an annular wall with at least a first annular electrically conductive contact ring thereon, and having
    a pickup unit comprising at least one microphone arranged on the earphone housing, wherein the at least one microphone is electrically connected to the earphone circuit,
    the first earphone housing including,
        a first speaker for receiving a speaker signal from the earphone circuit, and
    wherein said first ring has a predetermined width with its surface oriented generally concentric with said axis and formed annularly about the axis and mounted in electrical contact with the earphone circuit, and
    an earphone housing connector part comprising
    at least a first set of contact members mounted in the earphone housing connector part so as to provide electrical connection between the at least first set of contact members and the at least first ring, to thereby connect the at least first set of contact members to the first speaker; and
    an electronic circuit for processing signals from the at least one microphone,
    wherein the earphone housing with pickup is rotatable about the first axis with respect to the earphone housing connector part.

2. A headset according to claim 1 wherein the earphone housing connector part forms part of the earphone housing.

3. A headset according to claim 1, wherein the electronic circuit for processing the microphone signal is positioned in the earphone housing.

4. A headset according to claim 1, wherein the at least first set of contact members is formed to substantially engage said ring tangentially perpendicular to the annularly formed first ring.

5. A headset according to claim 1 wherein the first earphone housing comprises at least a first and a second ring of electrically conductive material arranged annularly and concentrically around the first rotational axis and wherein the earphone housing connector comprises corresponding at least first and second sets of contact members.

6. A headset according to claim 1, wherein two or more contact members in any set of contact members are connected in parallel for providing parallel electrical connection between each ring and the corresponding contact members.

7. A headset according to claim 1, wherein the at least first set of contact members is resiliently biased or spring-loaded towards the at least one ring.

8. A headset according to claim 1, wherein the pickup unit comprises or consists of a microphone boom.

9. A headset according to claim 1, wherein a first and a second contact member in any set of contact members extend from the earphone housing connector part under oblique angles toward the ring, so that under rotation of the earphone housing and/or the earphone housing connector part about the first rotational axis, the first contact member extends in the direction of rotation, and the second contact member extends opposite to the direction of rotation.

10. A headset according to claim 1 wherein the at least one annular ring is provided on a printed circuit board.

11. A headset according to claim 9, wherein the earphone circuit comprises the printed circuit board.

12. A headset according to claim 1, wherein the at least one annular ring is printed on a flex foil, and wherein the flex foil is arranged circumferentially on a housing of the first speaker.

13. A headset according to claim 1 wherein said annular contact include a pair of spaced part parallel contact rings.

14. A headset according to claim 1 wherein said housing connector includes a circular collar sized to receive said earphone housing and wherein said first set of contact members includes a pair of contact resilient wires extending from said housing connector toward said rings at angles offset from a ring axis extending orthogonal from said rings to engage said rings at least partly tangentially and having a generally planar contact portion joining and bridging said contacts; said contact portion engaging said line.

15. The headset of claim 14 wherein said pair of contact include first and second pairs of adjacent contacts including first and second non conducting insulating bridges for holding said first and second contact spaced from each other.

16. A headset for voice communication, the headset comprising:
    a first earphone housing being rotatable about a first rotational axis, said housing including an annular core with at least a first and second annular electrically conductive contact rings, and having
    a pickup unit comprising at least one microphone arranged on the earphone housing, wherein the at least one microphone is electrically connected to an earphone circuit,
    the first earphone housing comprising
    the earphone housing circuit,
    a first speaker for receiving a speaker signal from the earphone housing circuit, and
    wherein said first ring of electrically conductive rings have a predetermined width formed annularly about the axis and mounted in electrical contact with the earphone circuit,
    and
    an earphone housing connector part comprising
    an annular collar sized to receive said earphone housing and having a flange extending away from said collar to lie adjacent said rings, said flange including an aperture for receiving an electrical contact unit, said unit including at least a first and second set of contact members to provide electrical connection between the at least first set of contact members and said rings, and wherein the earphone housing with pickup is rotatable about the first axis.

17. The headset of claim 16 wherein said pickup unit is curved to engage said collar.

18. A headset for voice communication, the headset comprising:
an earphone circuit;
a first earphone housing being rotatable about a first rotational axis, said housing including an annular wall with at least a first annular electrically conductive contact ring thereon, and having
a pickup unit comprising at least one microphone arranged on the earphone housing, wherein the at least one microphone is electrically connected to the earphone circuit,
the first earphone housing including,
    a first speaker for receiving a speaker signal from the earphone circuit, and
wherein said first ring has a predetermined width with its surface oriented generally concentric with said axis and formed annularly about the axis and mounted in electrical contact with the earphone circuit, and
an earphone housing connector part comprising
at least a first set of contact members mounted in the earphone housing connector part so as to provide electrical connection between the at least first set of contact members and the at least first ring, to thereby connect the at least first set of contact members to the first speaker; and
an electronic circuit for processing signals from the at least one microphone,
wherein the earphone housing with pickup is rotatable about the first axis with respect to the earphone housing connector part and
    wherein the at least one annular ring is printed on a flex foil, and wherein the flex foil is arranged circumferentially on a housing of the first speaker.

* * * * *